United States Patent
Xu et al.

(10) Patent No.: US 10,087,015 B2
(45) Date of Patent: Oct. 2, 2018

(54) ROLLER ASSEMBLY AND TRANSMISSION DEVICE

(71) Applicants: BOE Technology Group Co., Ltd., Beijing (CN); Hefei BOE Optoelectronics Technology Co., Ltd., Anhui (CN)

(72) Inventors: Zhilong Xu, Beijing (CN); Xu Shi, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 41 days.

(21) Appl. No.: 15/122,173

(22) PCT Filed: Jun. 18, 2015

(86) PCT No.: PCT/CN2015/081763
§ 371 (c)(1),
(2) Date: Aug. 28, 2016

(87) PCT Pub. No.: WO2016/086646
PCT Pub. Date: Jun. 9, 2016

(65) Prior Publication Data
US 2018/0065813 A1    Mar. 8, 2018

(30) Foreign Application Priority Data
Dec. 4, 2014 (CN) .......................... 2014 1 0735336

(51) Int. Cl.
*B65G 39/04* (2006.01)
*B65G 13/02* (2006.01)

(52) U.S. Cl.
CPC ............. *B65G 39/04* (2013.01); *B65G 13/02* (2013.01); *B65G 2201/02* (2013.01)

(58) Field of Classification Search
CPC ........................................................ B65G 39/04
(Continued)

(56) References Cited

U.S. PATENT DOCUMENTS

| 4,034,837 A | * | 7/1977 | Vinarcsik | ............... | B65G 23/04 |
| | | | | | 193/37 |
| 4,585,118 A | * | 4/1986 | Plaut | ...................... | B65G 15/14 |
| | | | | | 198/605 |

(Continued)

FOREIGN PATENT DOCUMENTS

| CN | 102497990 A | 6/2012 |
| CN | 202296099 U | 7/2012 |

(Continued)

OTHER PUBLICATIONS

Rejection Decision for Chinese Patent Application No. 201410735336. 2, dated Feb. 3, 2017, 9 pages.

(Continued)

*Primary Examiner* — Joseph A Dillon, Jr.
(74) *Attorney, Agent, or Firm* — Westman, Champlin & Koehler, P.A.

(57) ABSTRACT

The present disclosure provides a roller assembly including: a support base provided with a shaft hole; and at least two circular arc segments that are detachably mounted on the support base, wherein the at least two circular arc segments constitute a roller and a vertical distance from any point on periphery of the roller to an axis of the shaft hole is larger than a vertical distance from any point on periphery of the support base to the axis of the shaft hole. The present disclosure also provides a transmission device including a roller assembly described above.

1 Claim, 5 Drawing Sheets

(58) Field of Classification Search
USPC .................. 193/37; 198/842, 843; 492/38
See application file for complete search history.

(56) References Cited

U.S. PATENT DOCUMENTS

| | | | |
|---|---|---|---|
| 5,045,045 A | | 9/1991 | Davenport et al. |
| 5,690,300 A | * | 11/1997 | Iannucci ............... B65H 75/22 242/571.2 |
| 7,246,694 B2 | * | 7/2007 | Yamahara ............. B65G 39/02 193/35 R |
| 8,409,063 B2 | | 4/2013 | Erbert et al. |
| 2007/0213188 A1 | * | 9/2007 | Yao ...................... C03B 35/181 492/16 |
| 2009/0143208 A1 | * | 6/2009 | Leger .................... B65G 39/09 492/45 |
| 2013/0186734 A1 | * | 7/2013 | Ivan ..................... B65G 39/071 198/842 |
| 2014/0034444 A1 | * | 2/2014 | Guo ...................... B65G 13/00 193/37 |

FOREIGN PATENT DOCUMENTS

| | | |
|---|---|---|
| CN | 102795477 A | 11/2012 |
| CN | 203006480 U | 6/2013 |
| CN | 203612555 U | 5/2014 |
| CN | 203714712 U | 7/2014 |
| CN | 104495273 A | 4/2015 |
| EP | 1 202 132 A1 | 5/2002 |
| JP | 2003-20112 A | 1/2003 |
| KR | 10-1291511 B1 | 7/2013 |
| KR | 10-2013-0133551 A | 12/2013 |
| TW | M326009 | 8/1996 |

OTHER PUBLICATIONS

International Search Report and Written Opinion, including English translation of Box No. V, for International Application No. PCT/CN2015/081763, dated Sep. 2, 2015, 9 pages.
English translation of first Office Action for Chinese Patent Application No. 201410735336.2, 4 pages.
English translation of second Office Action for Chinese Patent Application No. 201410735336.2, 6 pages.

* cited by examiner

ROLLER ASSEMBLY AND TRANSMISSION DEVICE

CROSS-REFERENCE TO RELATED APPLICATIONS

This application is a Section 371 National Stage Application of International Application No. PCT/CN2015/081763, which is filed on Jun. 18, 2015 and entitled with "Roller Assembly and Transmission Device", and claims priority to Chinese Application No. 201410735336.2, filed on Dec. 4, 2014 and entitled with "Roller Assembly and Transmission Device", the contents of which are incorporated herein by reference in their entirety.

BACKGROUND OF THE INVENTION

Field of the Invention

The present disclosure relates to a field of display panel manufacturing technology, and particularly to a roller assembly and a transmission device including the same.

Description of the Related Art

In a process of manufacturing a display panel, a substrate required for producing the display panel is typically transported by a transmission device. The existing transmission device usually includes a plurality of transmission shafts arranged side by side and motors that are connected to the transmission shafts, respectively. A plurality of rollers are mounted on each of the transmission shafts. After the substrate is placed on the transmission device, the substrate will be transported to a predetermined working station under driving from the rollers.

However, with the use of transmission device, the rollers mounted on the transmission shaft will wear, which may result in a requirement for replacing the worn roller. For the existing transmission device, when the worn roller is need to be replaced, it may be firstly necessary to disassemble the transmission shaft on which the worn roller is located, and then sequentially remove the other rollers that is arranged on a side of the roller to be replaced. After the worn roller has been replaced, it is necessary to mount the other rollers previously disassembled to the transmission shaft and mount the transmission shaft to the transmission devices. Therefore, this results in a plurality of disassembling and assembling steps that are necessary when the worn roller is replaced and thus the efficiency of replacing the rollers becomes low.

SUMMARY OF THE INVENTION

According to an aspect of the present disclosure, there is provided a roller assembly, including:
a support base provided with a shaft hole; and
at least two circular arc segments that are detachably mounted on the support base,
wherein the at least two circular arc segments constitutes a roller and a vertical distance from any point on periphery of the roller to an axis of the shaft hole is larger than a vertical distance from any point on periphery of the support base to the axis of the shaft hole.

According to another aspect of the present disclosure, there is provided a transmission device, including:
a supporting carrier; and
a plurality of transmission shafts mounted on the supporting carrier side by side,
wherein a plurality of roller assemblies according to the solutions described above are provided on each of the transmission shafts.

BRIEF DESCRIPTION OF THE DRAWINGS

Drawings described here are used to provide a further understanding on the present disclosure, form a part of the present disclosure. Exemplary embodiments of the present invention and the description thereof are used to explain the present disclosure and do not constitute an improper limitation to the present disclosure. In the drawings:

FIG. 3 (*b*) is a cross-sectional view of the roller assembly shown in FIG. 3 (*a*) that is taken along a line A-A;

DETAILED DESCRIPTION OF EMBODIMENTS OF THE INVENTION

To further illustrate a roller assembly and a transmission device according to an embodiment of the present invention, a detailed description will be made below with reference to the accompanying drawings.

An object of the present disclosure is to provide a roller assembly and a transmission device that includes the same, which may improve the efficiency of replacing the rollers.

Figure 1:
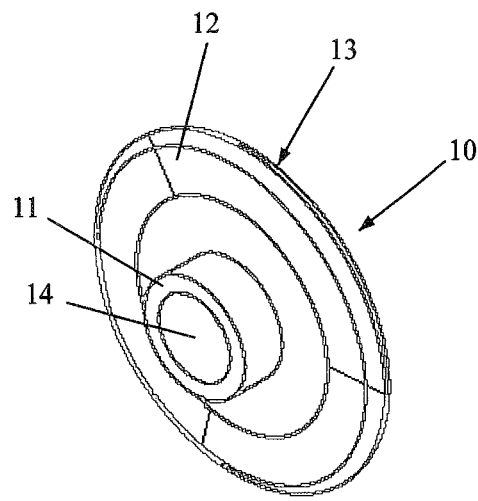
FIG. 1 is a structural schematic view of a roller assembly according to an embodiment of the present invention.

Referring to FIG. 1, a roller assembly 10 according to an embodiment of the present invention includes: a support base 11 provided with a shaft hole 14; and at least two circular arc segments 12 that are detachably mounted on the support base 11. The at least two circular arc segments 12 constitute a roller 13 and a vertical distance from any point on periphery of the roller 13 to an axis of the shaft hole 14 is larger than a vertical distance from any point on periphery of the support base 11 to the axis of the shaft hole 14.

When the roller assembly according to the embodiment of the present invention is provided on the transmission shaft of the transmission device, the support base is mounted around the transmission shaft through the shaft hole and fixed with respect to the transmission shaft. The roller consists of at least two circular arc segments detachably mounted on the support base. When a worn roller assembly is necessary to be replaced, since a worn part of the roller assembly is located on the periphery of the roller and the roller consists of at least two circular arc segments detachably mounted on the support base, only the worn roller is necessary to be disassembled without disassembling and replacing the transmission shaft and the support base along with the worn roller together. Compared with the solution in the prior art that the roller can be replaced only when the transmission shaft is disassembled from the transmission device and then the other rollers that is arranged on a side of the roller to be replaced are sequentially removed, a plurality of disassembling and assembling steps of the transmission shaft and the other rollers that are arranged on transmission shaft can be omitted, thereby improving the efficiency of replacing the rollers.

Figure 2:
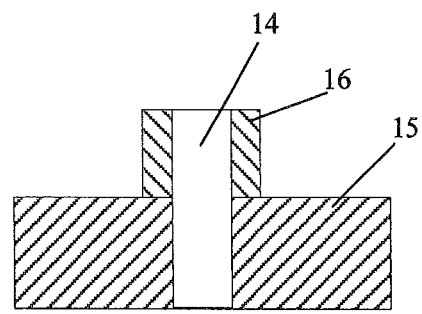
FIG. 2 is a cross-sectional view of a support base of the roller assembly shown in FIG. 1.

In particular embodiments, there may be various specific forms for the support base 11 in structure. In one embodiment, in order to facilitate the support base 11 to be fixedly connected to the transmission shaft and the roller 13, respectively, as shown in FIG. 2, the support base 11 includes a chuck portion 15 and a shaft-catching portion 16 fixedly connected to each other. The shaft hole 14 penetrates through the chuck portion 15 and the shaft-catching portion 16. The at least two circular arc segments 12 are detachably mounted on the chuck portion 15 to constitute the roller 13. Such a design may facilitate the shaft-catching portion 16 to be mounted around and fixed onto the transmission shaft and facilitate the various circular arc segments 12 that constitute the roller 13 to be detachably mounted on the chuck portion 15. That is, such a design may facilitate the support base 11 to be fixedly connected to the transmission shaft and the roller 13, respectively.

Figure 3A:
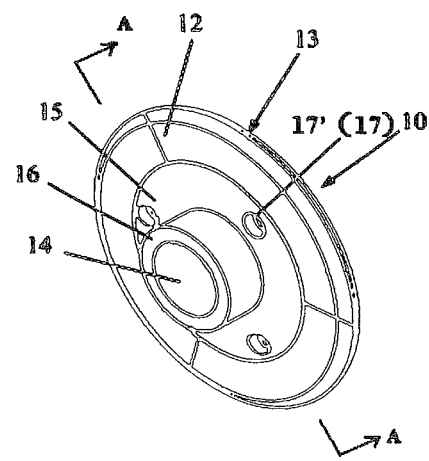
FIG. 3 (*a*) is a schematic view of an arrangement of a first threaded hole in the roller assembly according to an embodiment of the present invention.
Figure 3B:
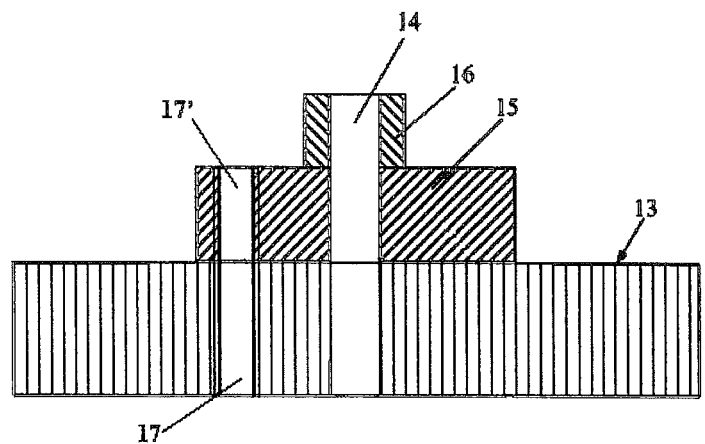

As described above, the respective circular arc segments 12 are detachably mounted on the chuck portion 15, in particular, in a connecting manner of clamping. However, in order to ensure firmness of the circular arc segments 12 being mounted on the chuck portion 15, in one embodiment, a threaded connection is preferably employed. Specifically, for example, as shown in FIGS. 3 (a) and 3 (b), a first threaded hole 17 is provided in each of the at least two circular arc segments 12. The chuck portion 15 is provided with at least two first thread-engaging holes 17', each of which corresponds to the first threaded hole 17 in each circular arc segment 12, respectively. The circular arc segments 12 may be detachably mounted on the chuck portion 15 by screwing a screw (not shown) into the first threaded hole 17 and the corresponding first thread-engaging hole 17'. It should be noted that, although the first threaded hole 17 shown in FIG. 3 (b) is a through hole, those skilled in the art can appreciate that the first threaded hole 17 may be a blind hole, as long as the circular arc segments 12 can be detachably mounted on the chuck portion 15.

Figure 4:
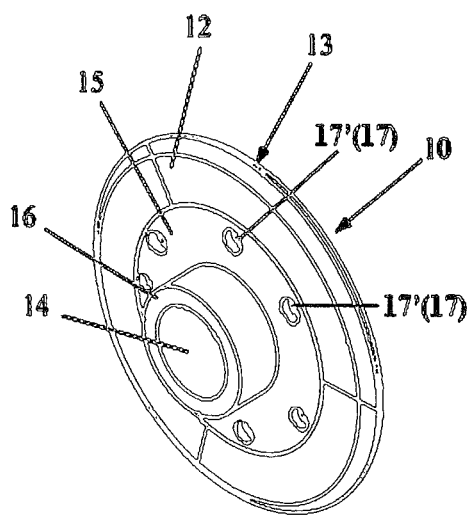
FIG. 4 is a schematic view of another arrangement of the first threaded hole in the roller assembly according to an embodiment of the present invention.

In order to further strengthen the firmness of the fixed connection between each circular arc segment 12 and the chuck portion 15, referring to FIG. 4, two first threaded holes 17 are provided in each of the at least two circular arc segments 12, respectively. Accordingly, the chuck portion 15 is provided with at least four first thread-engaging holes 17' which corresponds to the various first threaded holes 17 in the at least two circular arc segments 12, respectively. The circular arc segments 12 may be detachably mounted on the chuck portion 15 by screwing screws (not shown) into the first threaded holes 17 and the corresponding first thread-engaging hole 17'.

Figure 5:
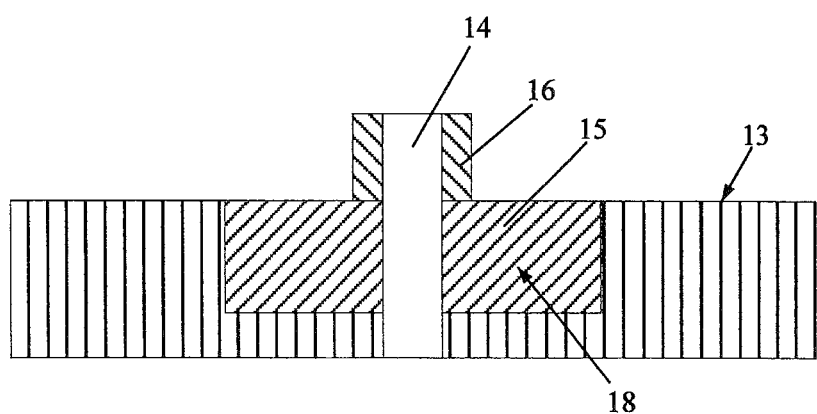
FIG. 5 is a general cross-sectional view of the roller assembly in FIG. 1.

In one embodiment, in order to strengthen the firmness of the fixed connection between each circular arc segment 12 and the chuck portion 15, referring to FIG. 5, a groove 18 is formed on a side of the roller 13 which consists of the at least two circular arc segments 12. The chuck portion 15 is seated in the groove 18. It should be noted that, a depth of the recesses 18 is not limited to be same as a thickness of the chuck portion 15 as shown in FIG. 5. Any depth of the groove 18 that achieves the placement of a portion of the chuck portion 15 in the groove 18 is suitable for the embodiment of the present invention. A shape of the groove 18 may be triangular, rectangular, circular, oval or polygonal. A shape of the respective chuck portion 15 matches to that of the groove 18.

Figure 6:
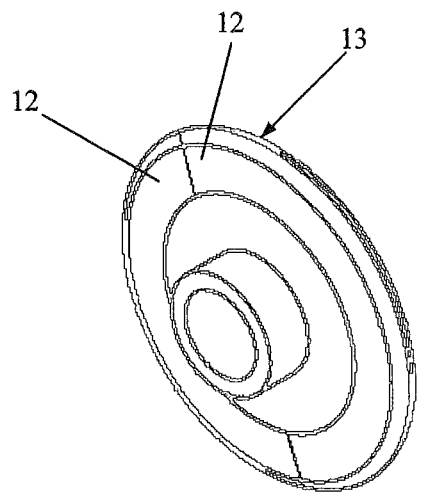
FIG. 6 is a structural schematic view of another roller assembly according to an embodiment of the present invention.

In the above embodiment, the roller 13 consists of at least two circular arc segments 12. In order to improve the efficiency of disassembling and assembling the circular arc segments 12 and reduce the difficulty of producing the circular arc segments 12, referring to FIG. 6, it is preferable that there are two circular arc segments 12 and the two circular arc segments 12 are semicircular arc segments.

Figure 7:
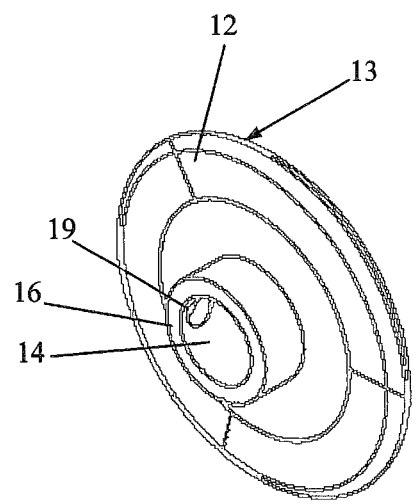
FIG. 7 is a schematic view of an arrangement of a second threaded hole in the roller assembly according to an embodiment of the present invention.

As described above, the shaft-catching portion 16 is fixedly mounted on the transmission shaft, in particular, in a connecting manner of clamping. However, in order to ensure firmness of the shaft-catching portion 16 being fixedly mounted on the transmission shaft, in one embodiment, a threaded connection is preferably employed. Specifically, referring to FIG. 7, a second threaded hole 19 that is communicated with the shaft hole 14 is provided in the shaft-catching portion 16. The second threaded hole 19 is used to receive a screw that fixes the support base 11 on the transmission shaft. When the shaft-catching portion 16 is mounted around the transmission shaft, an end of the screw may be placed against the transmission shaft by screwing the screw (not shown) into the second threaded hole 19 so as to ensure the firmness of the shaft-catching portion 16 being fixedly mounted on the transmission shaft.

Figure 8:
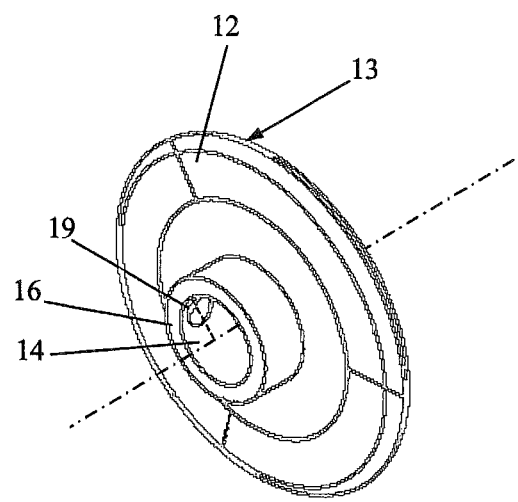
FIG. 8 is a structural schematic view when a center line of the second threaded hole in FIG. 7 is perpendicular to an axis of the shaft hole.
Figure 9:
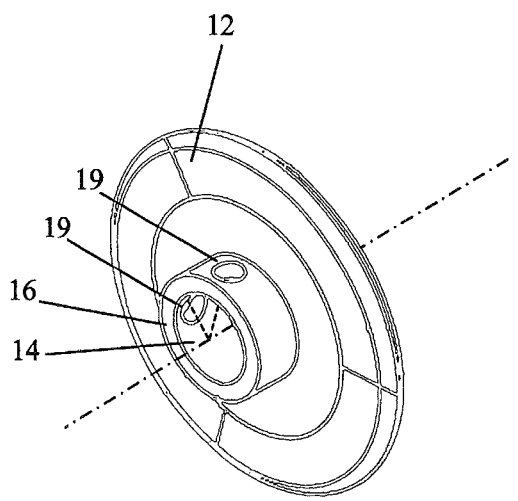
FIG. 9 is a schematic view of another arrangement of the second threaded hole in the roller assembly according to an embodiment of the present invention.

The above second threaded hole 19 may be provided in the shaft-catching portion 16 in various arrangement manners. In order to enhance the fixing effect of the screw in the second threaded hole 19 to the shaft-catching portion 16, referring to FIG. 8, it is preferable that a center line of the second threaded hole 19 perpendicularly intersects with an axis of the shaft hole 14. In order to further strengthen the firmness of the fixed connection between the shaft-catching portion 16 and the transmission shaft 20, referring to FIG. 9, there are two second threaded holes 19 and the center lines of the two second threaded holes 19 are perpendicular to each other. As such, the shaft-catching portion 16 is fixedly mounted on the transmission shaft through two screws perpendicular to each other.

Figure 10:
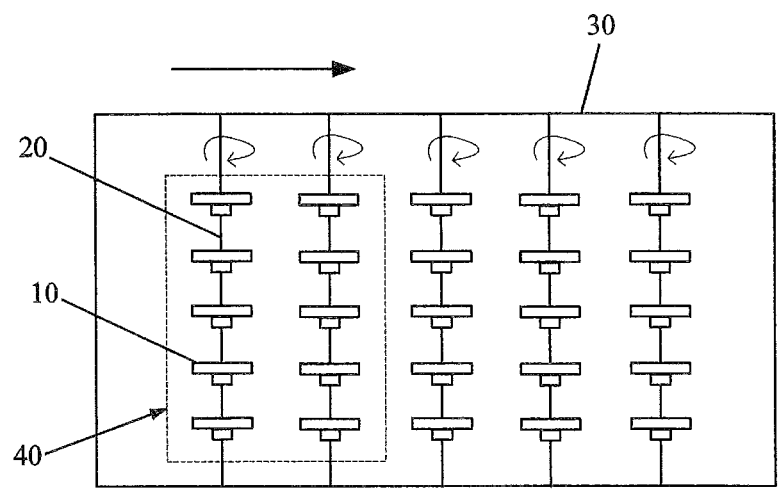
FIG. 10 is a top view of a transmission device according to an embodiment of the present invention.

Referring to FIG. 10, an embodiment of the present invention further provides a transmission device, including: a supporting carrier 30 and a plurality of transmission shafts 20 mounted on the supporting carrier 30 side by side. A plurality of roller assemblies 10 as described above are provided on each of the transmission shafts 20. In particular, referring to FIG. 10, the transmission shafts 20 rotate in a rotation direction shown in FIG. 10 and drive the various roller assemblies 10 on the transmission shafts 20 to rotate such that plate-like production 40 is transported in a transmission direction shown in FIG. 10.

Figure 11:
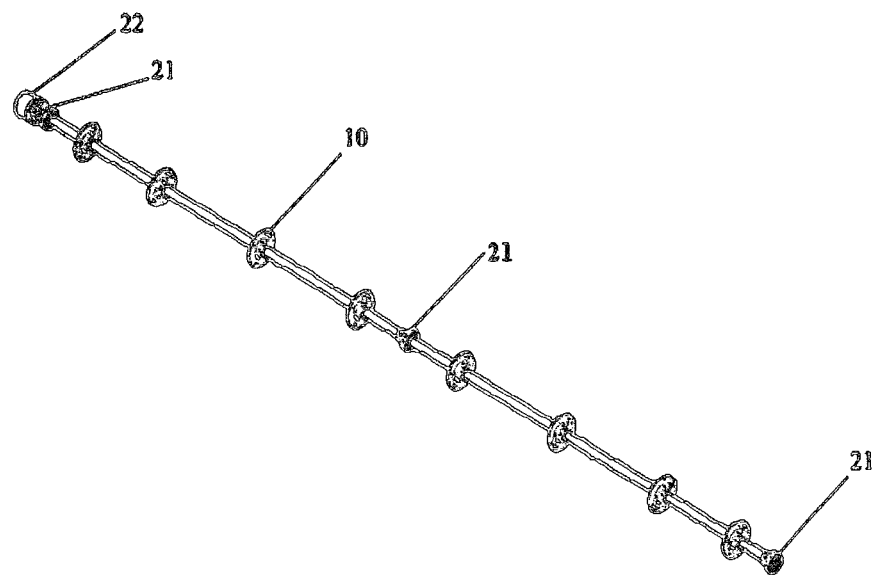
FIG. 11 is a structural schematic view of the transmission shaft in FIG. 10.

Specifically, the structure of the supporting carrier 30 is known to those skilled in the art and thus will not be described in detail herein. Components mounted on the transmission shaft 20, referring to FIG. 11 for detail, include: three bearings 21 that are mounted on the supporting carrier 30 and located at two ends of and middle portion of the transmission shaft 20; a driving motor 22 connected to an end of the transmission shaft 20; and roller assemblies 10 located between two adjacent bearings 21.

When a plate-like production is transported by a transmission device according to an embodiment of the present invention, the support base is mounted around the transmission shaft through the shaft hole and fixed with respect to the transmission shaft. The roller consists of at least two circular arc segments detachably mounted on the support base. When a worn roller assembly is necessary to be replaced, since a worn part of the roller assembly is located on the periphery of the roller and the roller consists of at least two circular arc segments detachably mounted on the support base, only the worn roller is necessary to be disassembled without disassembling and replacing the transmission shaft and the support base along with the worn roller together. Compared with the solution in the prior art that the roller can be replaced only when the transmission shaft is disassembled from the transmission device and then the other rollers that are arranged on a side of the roller to be replaced are sequentially removed, a plurality of disassembling and assembling steps of the transmission shaft and the other rollers that are arranged on transmission shaft can be omitted, thereby improving the efficiency of replacing the rollers.

The transmission device according to the embodiment of the invention may achieve the function of the roller assembly 10 described above. The achievement of the specific structure can refer to the description on the roller assembly 10 in the above embodiments and will not be described in detail here. The roller assembly and the transmission device according to the embodiments of the present invention can be used to transport the plate-like production, such as a substrate for manufacturing a display panel, but is not limited thereto.

In the description of the above-described embodiments, the particular features, structures, materials, or characteristics may be combined together in an appropriate manner in any or a plurality of embodiments or examples.

As discussed above, only specific embodiments of the present invention are provided, but the protection scope of the present disclosure is not limited thereto. Any variations or alternations that can be envisaged by those skilled in the art within the technical scope of this disclosure will fall within the protection scope of the present application. Accordingly, the protection scope of the application should be defined by the appended claims.

What is claimed is:

1. A roller assembly, comprising:
a support base provided with a shaft hole; and
at least two circular arc segments that are detachably mounted on the support base,
wherein the at least two circular arc segments constitute a roller and a vertical distance from any point on periphery of the roller to an axis of the shaft hole is larger than a vertical distance from any point on periphery of the support base to the axis of the shaft hole,
wherein the support base comprises a chuck portion and a shaft-catching portion fixedly connected to each other, the shaft hole penetrates through the chuck portion and the shaft-catching portion, and the at least two circular are segments are detachably mounted on the chuck portion to constitute the roller,
wherein a first threaded hole is provided in each of the at least two circular are segments, the chuck portion is provided with at least two first thread-engaging holes, each of which corresponds to the first threaded hole in each circular arc segment, and the circular arc segment is detachably mounted on the chuck portion by screwing a screw into the first threaded hole and the corresponding first thread-engaging hole.

* * * * *